May 8, 1962 P. B. R. FULLER 3,033,065
LATCHED STRIPPER MEANS OPERABLE TO STRIP WORK FROM PUNCH MEANS
Filed March 7, 1958 8 Sheets-Sheet 1

Fig. 1.

INVENTOR
PETER BRIAN ROLAND FULLER,
BY
ATTORNEY

Fig. 3.

INVENTOR
PETER BRIAN ROLAND FULLER,
BY
ATTORNEY

United States Patent Office 3,033,065
Patented May 8, 1962

3,033,065
LATCHED STRIPPER MEANS OPERABLE TO STRIP WORK FROM PUNCH MEANS
Peter Brian Roland Fuller, Stanmore, England, assignor to The British Thomson-Houston Company Limited, London, England, a British company
Filed Mar. 7, 1958, Ser. No. 719,949
Claims priority, application Great Britain Mar. 19, 1957
5 Claims. (Cl. 83—131)

This invention relates to power presses of the kind comprising a relatively movable punch and die for cutting sheet materials. The invention relates particularly to arrangements for stripping the work from the punch. When power presses are employed for piercing apertures, holes, or the like, in the work, withdrawal of the punch will tend to carry the work away from the die and it is therefore desirable to provide means which will hold the work adjacent the die whilst the punch is withdrawn.

The invention has for its object to provide an advantageous arrangement of power press whereby the work may be operated on after the sheet comprising the work has been flanged or bent out of the normal plane thereof, for example by being flanged or bent at the edges thereof for stiffening purposes. In order that the work having flanged edges or otherwise bent out of the original plane thereof can be inserted between and withdrawn from the co-operating punch and die, it is necessary to provide a comparatively long stroke of the press sufficient to allow the punch and die in the withdrawn position to clear the flanged or bent portion of the work. It will be understood that where the work comprises an un-bent plane sheet the clearance between the punch and die in the withdrawn position of the punch need be only slightly greater than the thickness of the sheet. If, however, the press is arranged with a comparatively long stroke the sheet may be lifted by a considerable distance on the return movement of the punch and there is a consequent risk of damage to the sheet by buckling thereof or otherwise.

According to the present invention, a power press is provided with stripping means comprising a work-engaging abutment member preferably arranged adjacent the punch, and operating means for said member adapted to move the latter toward and away from the work, said movement being derived from or under control of the movement of the punch relatively to the die, whereby prior to withdrawal of the punch after the latter has cut the work said member is positioned relatively to the die for retaining the work during withdrawal of the punch and thereafter said member is withdrawn clear of the work so that with the punch also drawn clear of the work the latter may be withdrawn from the press. Preferably the work-engaging member is movable in the same direction as the punch and preferably also is operated toward and away from the work at the same time as the punch is moved toward and away from the work and the die.

The invention also comprises a power press having stripping means comprising a work engaging abutment member movable toward and away from the work and means co-ordinating the movements of said abutment with that of the punch relatively to the die, said means permitting relative movement between the punch and the abutment during the operative part of the piercing or cutting stroke of the machine, and means for positively holding the abutment in position to prevent movement of the work with the punch during withdrawal of the latter with respect to the die, subsequently said abutment being withdrawn clear of the work, preferably positively by the punch or a member mechanically coupled therewith.

By means of the invention a power press may be arranged with a stroke sufficient to allow insertion and withdrawal between the punch and the die of a sheet, flanged or otherwise bent as hereinbefore indicated, without damage to the work, the invention enabling the work to be stripped automatically from the punch during the initial movement withdrawing the punch from the die.

According to a further feature of the invention, the work-engaging member is provided with latching means which upon movement of the member into the position for retaining the work will latch said member against return movement, and said latching means are trippable, in response to withdrawal of the punch, by a distance sufficient to permit the work to be withdrawn from between the punch and the die. Thereafter the work-engaging member is allowed free return movement, namely unrestricted by the latching means, such return movement conveniently being effected directly by a lost-motion connection between the work-engaging member and the punch, or a member moving with the punch.

According to a still further feature of the invention, the stripping means comprise latching means which are operable by an auxiliary ram or member coupled with a main ram or other member operating the punch and having a lost-motion connection with said latching means whereby at or toward the end of the punching stroke of said main ram or other member to position said latching means in the path of withdrawal of the work-engaging abutment from the work and to retain said abutment in said position until the punch has been withdrawn from the work and then to position said latching means for allowing upward movement of the work-engaging member.

The invention is applicable to all types of power presses, which may be operated mechanically or by air pressure or hydraulically for example. The invention has an important application in turret presses, namely wherein a plurality of punches of required different forms and/or sizes are mounted on a rotatable or otherwise movable carrier member which is adapted to be moved so as to position said punches selectively in alignment with the operating means for moving said punches toward and away from the die. According to another feature of the invention, a plurality of work-engaging members as hereinbefore indicated are provided in association respectively with the several punches. It is to be understood, however, that the invention is equally applicable to single ram presses, that is to say presses for effecting single punching operations.

Three embodiments of the invention will now be described by way of example with reference to the accompanying drawings, in which.

Figure 1:
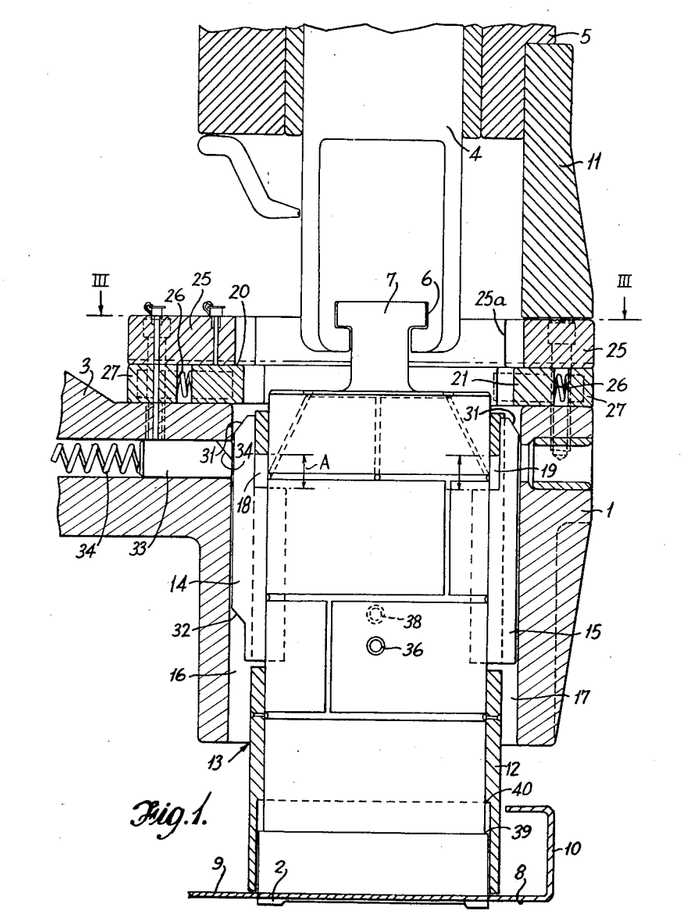
FIG. 1 is a fragmentary vertical sectional elevation of part of a turret press arranged in accordance with one embodiment of the invention.
Figure 2:
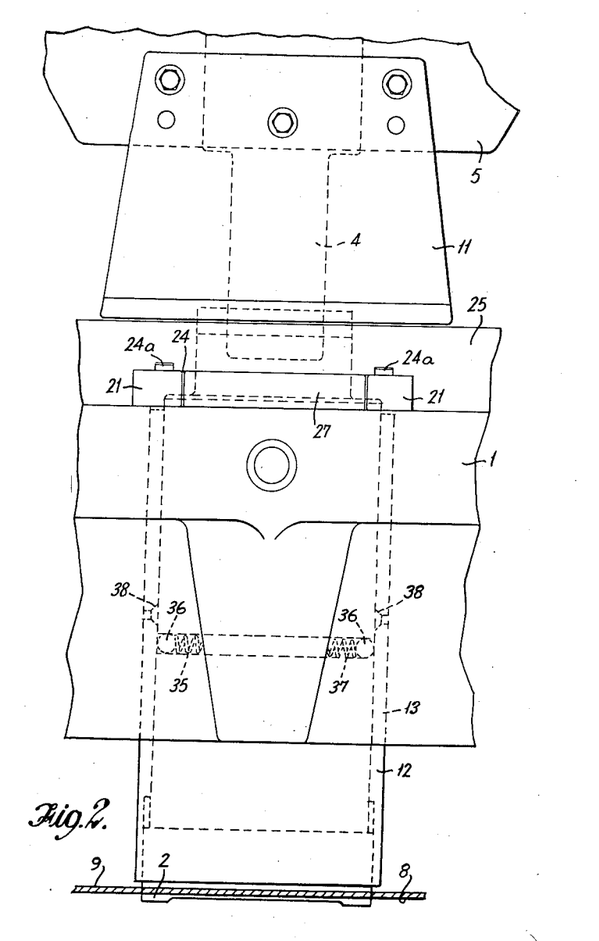
FIG. 2 is a fragmentary elevation taken from the right-hand of FIG. 1.
Figure 3:
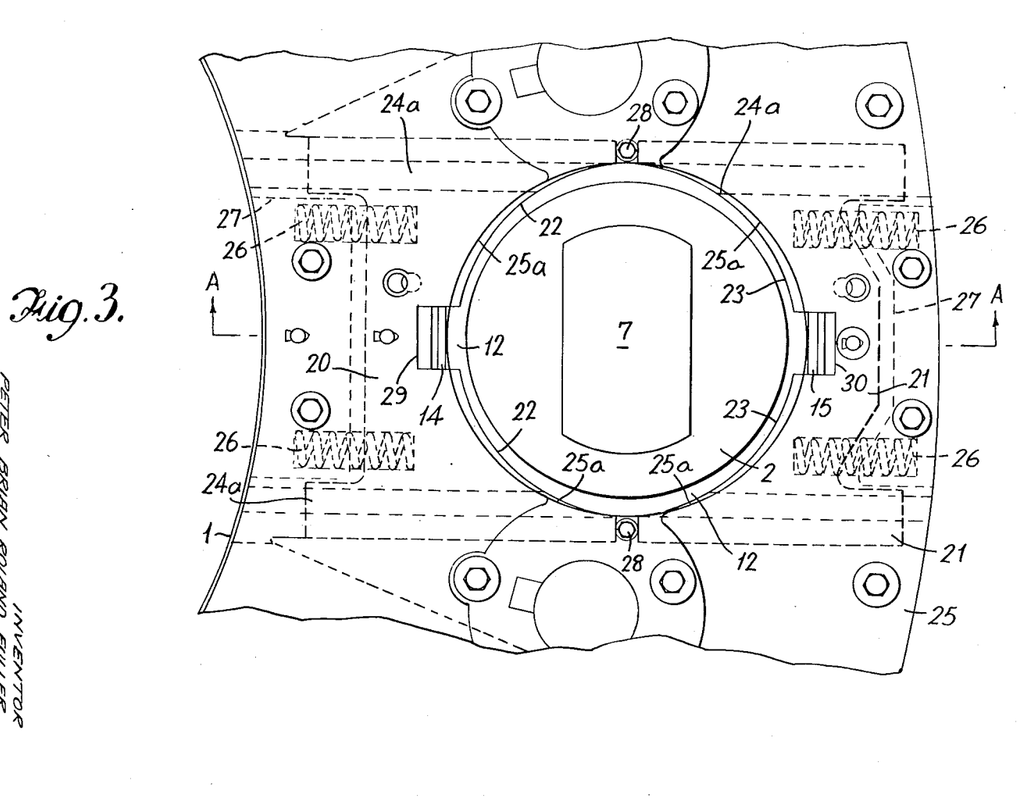
FIG. 3 is a fragmentary plan view taken on the line III—III of FIG. 1.

Referring to FIGS. 1 to 3 of the drawings, part of the turret of a turret press appears at 1, this turret comprising an annular rim in which are positioned the desired number of punches of the required shapes and sizes. One of these punches is shown at 2. The rim is carried by a central portion 3 (FIG. 1) of the turret so as to be rotatable about a vertical axis, whereby each of the punches may be brought in turn into vertical alignment with an operating ram 4 mounted for vertical movement in a fixed part, partly shown at 5, of the main frame of the press. This ram is connected at its upper end (not shown) with the mechanical pneumatic or hydraulic operating means. The lower end of the ram 4 is formed with a T-slot 6 (FIG. 1) which engages a similarly shaped extension 7 of the punch, such as 2, aligned at any time with the ram, the T-slot allowing the rotational movement of the turret 1 for selective positioning of the several dies below the ram 4.

The die face appears at 8 and a sheet constituting the work is shown at 9, this sheet having flanged edges as can be seen at 10. The punch 2 is shown in the lowermost position thereof, in which it has pierced the sheet 9 and entered the aperture in the die face 8.

At 11 is shown a reaction block, bolted to the part 5, and adapted to engage the upper surface of the turret to prevent upward movement thereof when the punch 2 is moved upwardly.

In this embodiment of the invention a work-engaging or stripping member is provided in the form of a sleeve 12 closely fitting the punch 2 and vertically movable within a cylindrical bore 13 of the turret 1, the sleeve thereby serving to locate the punch 2 in vertical alignment with the opening in the die face. The punch 2 is prevented from rotating about its axis by means of a pair of elongated keys 14 and 15 (FIG. 1) which are fixed in slots in the punch and which are slidably located by vertical key-ways 16 and 17 formed on the bore 13. The keys 14 and 15 extend through axial slots 18 and 19 formed in the sleeve 12, said slots being of greater length than the part of the keys therewithin so as to provide a clearance A allowing corresponding motion between the punch 2 and said sleeve.

A pair of latch plates 20 and 21 are mounted on the upper face of the turret 1, these plates having substantially semi-circular opposing edges 22 and 23 as can be seen from FIG. 3. The latch plates are slidably registered for movement radially of the turret in a slot or recess 24 (FIG. 2) in an annular top casting 25 bolted to the turret rim 1. The latch plates are guided by tenons and slots at 24a and are biased toward one another by compression springs 26 acting between said plates and abutment blocks 27 bolted in place between the turret rim 1 and the top casting 25. The movement of the latch plates toward one another is limited by studs or dowels 28 (FIG. 3).

The substantially semi-circular edges of the latch plates are interrupted at 29 and 30 (FIG. 3) to allow passage of the keys 14 and 15 during operation as will hereinafter be described. Also for purposes hereinafter to be described the upper ends of the keys 14 and 15 are chamfered, namely at 31 (FIG. 1), the lower end of the key 14 is stepped and chamfered as shown at 32, and a plunger 33 having a chamfered end is slidably mounted in a radial bore in the turret rim 1, said plunger being urged outwardly by means of a compression spring 34.

The punch 2 is provided with a radial passage 35 housing two balls 36 which are urged outwardly by means of a compression spring 37. The internal surface of the sleeve 12 is provided with conical indentations 38 adapted to receive said balls during operation as will hereinafter be described.

The various parts are shown in FIGS. 1, 2 and 3, in their positions immediately after the punch 2 has pierced the work 9, and in the absence of any swarf or the like disposed between the sleeve 12 and the work 9. Accordingly when the punch is withdrawn upwardly by the ram 4 the work 9 is lifted by the punch so as to move sleeve 12 upwardly by a short distance until its upper edge bears against the under-surfaces of the latch plates 20 and 21. The punch is then retracted within the sleeve 12 and thereby the work is stripped from the punch. If any swarf or the like is present between the lower edge of sleeve 12 and the work 9, however, then the upward movement of the sleeve 12 will be accordingly reduced or entirely eliminated. The continued upward movement of the punch brings the chamfered end 31 of the keys 14 and 15 into engagement with the edges of the slots 29 and 30 in the latch plates and will force said plates outwardly against the action of the springs 26. When the keys are drawn into said slots the arcuate surfaces 22 and 23 of the latch plates are drawn clear of the outer surface of the sleeve 12 so that the latter is free to be moved upwardly. When the clearance A between the keys 14 and 15 and the sleeve 12 has been taken up the latter will be lifted bodily with the punch 2. The lower end of the punch may be stepped as shown at 39 and the sleeve 12 internally shouldered as shown at 40 so that the punch will engage the sleeve to lift the latter.

The punch and sleeve may thus be withdrawn a sufficient distance, after stripping of the work from the punch, to clear the flanged edges such as 10 so that the work can be withdrawn. It will be understood that the top casting 25 is provided with an aperture 25a allowing the passage of the sleeve 12 and the keys 14 and 15.

In the embodiment described the press is arranged for a stroke of slightly more than 4″, but it will be understood that the arrangement may be adapted for any desired length of stroke.

The plunger 33 serves to retain the punch and sleeve in the fully withdrawn position in accordance with a known practice for retaining the punches of turret presses when the turret is rotated.

In the operating stroke of the arrangements shown in FIGS. 1–3, the downward movement of the ram will move the punch and sleeve together until the sleeve engages with the work or with any swarf or the like disposed on the upper surface of said work. Further movement of the sleeve being prevented the punch 2 will then continue its movement through the work and into the die, the various parts then being again in the position illustrated in FIG. 1.

The spring-pressed balls 36 co-operate with the indentations 38 so as to hold the sleeve in its lowermost position with respect to the punch, in spite of any frictional forces, until the sleeve engages the work.

Figure 4:
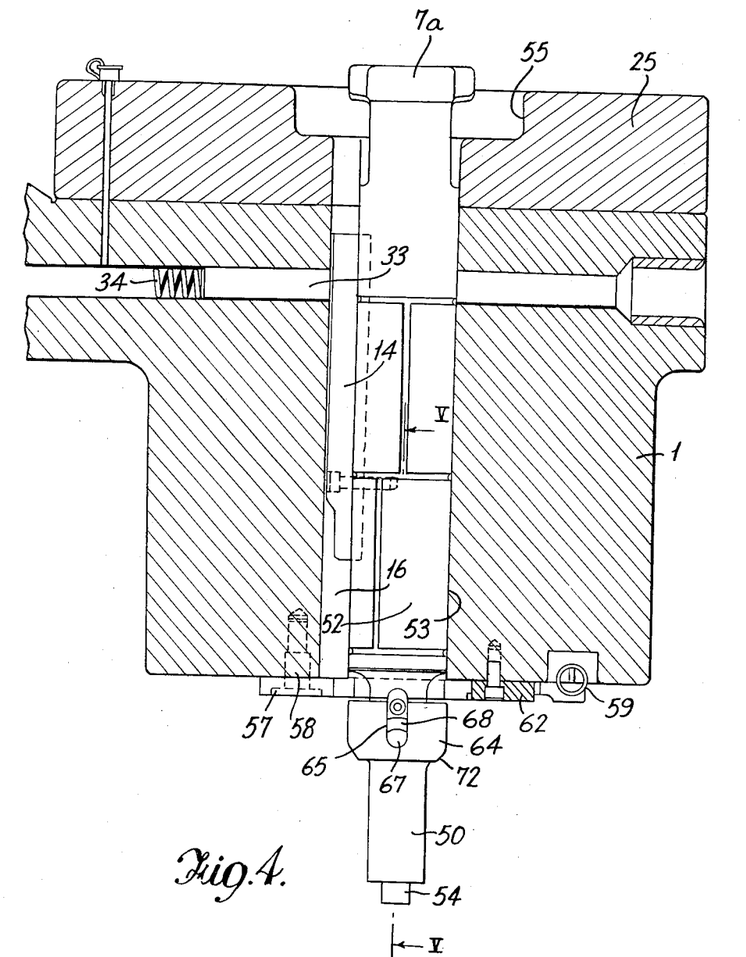
FIG. 4 is a fragmentary vertical elevation corresponding with part of FIG. 1 and illustrating another embodiment of the invention.
Figures 5, 7, 8:
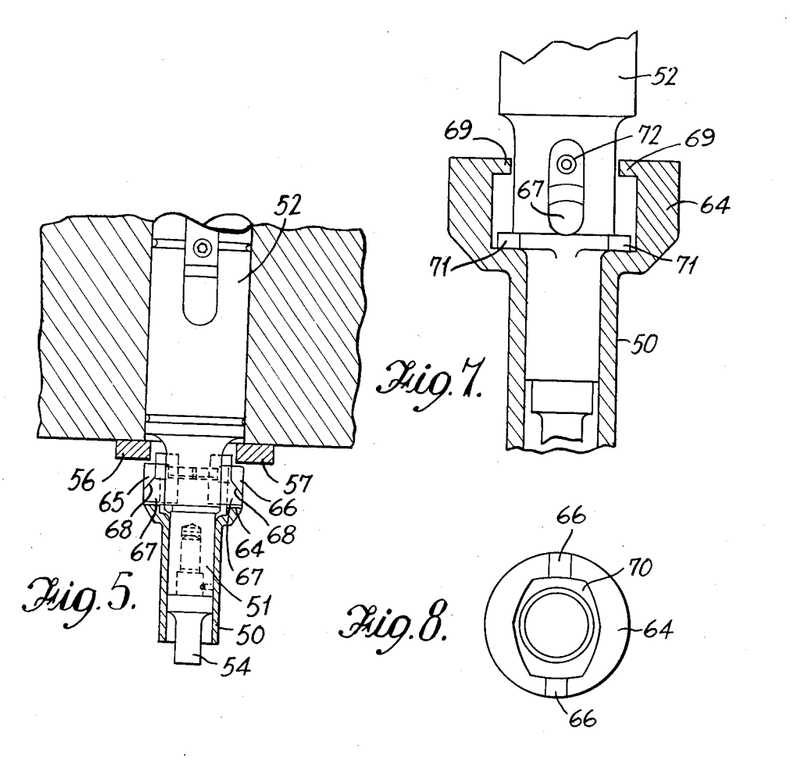
FIG. 5 is a fragmentary sectional elevation taken on the line V—V of FIG. 4.
FIG. 7 is a fragmentary sectional elevation, being part of FIG. 4.
FIG. 8 is a plan view of a sleeve employed in the arrangement of FIG. 4.
Figure 6:
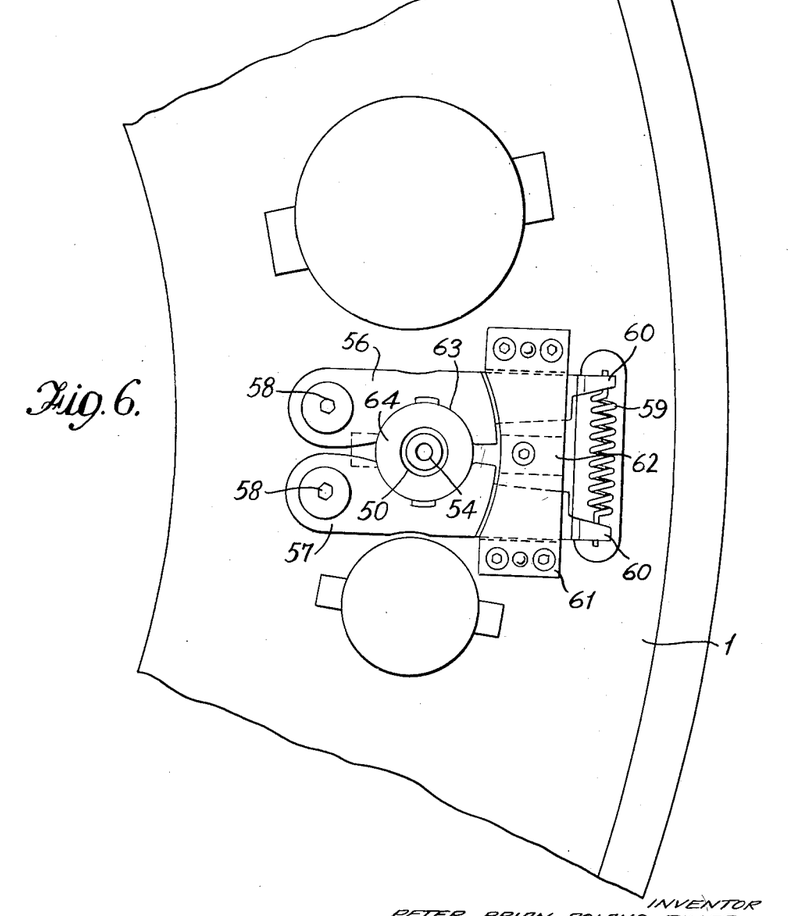
FIG. 6 is an under plan view of the arrangement of FIGS. 4 and 5.
Figure 9:
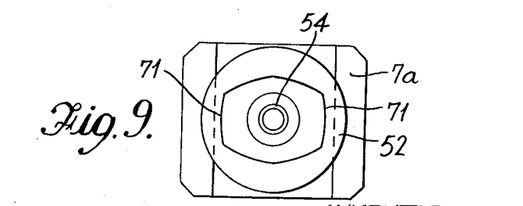
FIG. 9 is an under plan view of the punch holder of FIG. 4.

In FIGS. 4, 5 and 6, the turret rim is again shown at 1 with the top casting 25, and it will be understood that the embodiments of these figures and of FIGS. 1–3 may be employed in the same turret, FIGS. 4–6 showing an arrangement adapted for punching comparatively smaller holes, whilst the arrangement shown in FIGS. 1–3 is advantageous for punching large holes.

Referring to FIGS. 4 to 9 inclusive, the work-engaging or stripper member comprises a sleeve 50 which is mounted on and carried by the lower end 51 of a punch holder 52 which is slidably mounted in a bore 53 in the turret rim 1, but registered against rotation by axially extending key 14 working within key-way 16. The punch holder 51, 52 has removably secured therewithin a punch 54. The upper end of the punch holder 52 is formed at 7a for engagement with the T-slotted operating ram 4 of FIG. 1. The top casting 25 is recessed at 55 to accommodate the lower end of the ram 4 (FIG. 1) at the lower end of the stroke of the latter.

A pair of latching levers 56 and 57 are pivotally mounted by journal studs 58 on the under face of the turret rim 1 and are urged toward one another by means of a tension spring 59 extending between tail portions 60 of said levers. The levers are held against the under face of the turret rim 1 by a strap 61 (FIG. 6) secured to said under face, but allowing free pivotal movement of the levers. The strap 61 is formed with a central abutment portion 62 which forms a stop limiting the movement of the levers toward one another. The levers are provided with arcuate notches 63 of the same diameter as the enlarged upper end 64 of the stripping sleeve 50. This enlarged end is provided with axially extending slots 65 and 66 through which extend respectively keys 67 which are secured to the end 51 of the punch holder. These keys are provided with stepped and chamfered parts 68 operating as hereinafter to be described.

The enlarged end 64 of the stripping sleeve is formed with a pair of inturned lips 69 (FIG. 7) defining a substantial central segment 70 of the circular interior of said end. The punch holder 52 is formed with a pair of radially projecting lips 71 corresponding in form with the opening 70. The lips 71 co-operating with the lips 69 and with the lower surface of the opening within the enlarged end 64 to limit the axial movement of the sleeve, in both directions, with respect to the punch holder. In assembling the sleeve on the punch holder the sleeve is angularly positioned with the opening 70 in alignment with the lips 71, moved axially into its operative position and then rotated through 90° to the positon shown in the drawings. The keys 68 are placed in position after the sleeve 50, conveniently being secured to the punch holder by diametral screws 72.

In the operation of the arrangement shown in FIGS. 4–9, said figures again showing the arrangement at the end of the punching stroke when the punch holder 52 is then raised, such as by the ram 4 of FIG. 1, the sleeve 50 will be retained against upward movement by abutment against the latching levers 56 and 57 which at this time have been drawn together by the spring 59 into engagement with the abutment 62. The work is thus held by the lower end of the sleeve 50 and the punch 54 withdrawn from the work. Continued upward movement of the punch holder 52 will bring the chamfered shoulders of the keys 68 into engagement with the latching levers 56 and 57 as can be seen most clearly from FIG. 5. Said levers will thus be moved apart and will eventually release the upper surface of the enlargement 65 of the stripping sleeve. Shortly afterwards the lips 71 (FIG. 7) will engage the lips 69 on the stripping sleeve and thereby raise the latter through the arcuate notches 63 of the latching levers and into the bore 53 in the turret rim 1. The punch holder punch and stripping sleeve are thus raised to the required distance for withdrawal of the work.

During the punching stroke the sleeve 50 will be lowered with the punch holder until the lower part of the enlarged end 64 comes to rest on the upper surface of the latching levers 56 and 57. The lower part of the sleeve 50 has moved freely through the notches 63 and the enlargement 64 is provided with a conical surface 72 which under the downward force, which will now be exerted by the keys 67 on the lower ends of the slots 65 and 66, will positively move the sleeve 50 downwardly at the same time forcing the latching levers 56 and 57 apart. The punch 54 passes through the work and at the end of the stroke the upper end face of the enlarged end 64 of the stripping sleeve will be again positioned below the latching levers 56 and 57, namely as shown in the drawings, in readiness for the next return stroke.

Figure 10:
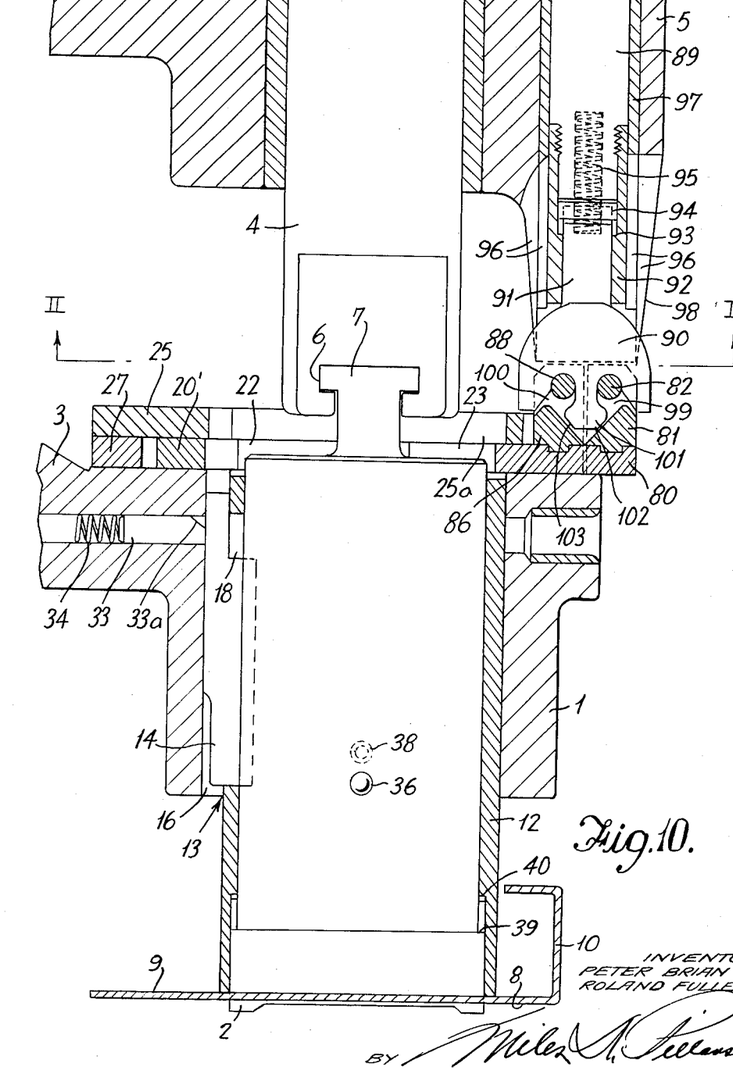
FIG. 10 is a fragmentary vertical sectional elevation of part of a turret press arranged in accordance with a further embodiment of the invention and otherwise generally similar to that illustrated in FIG. 1.
Figure 11:
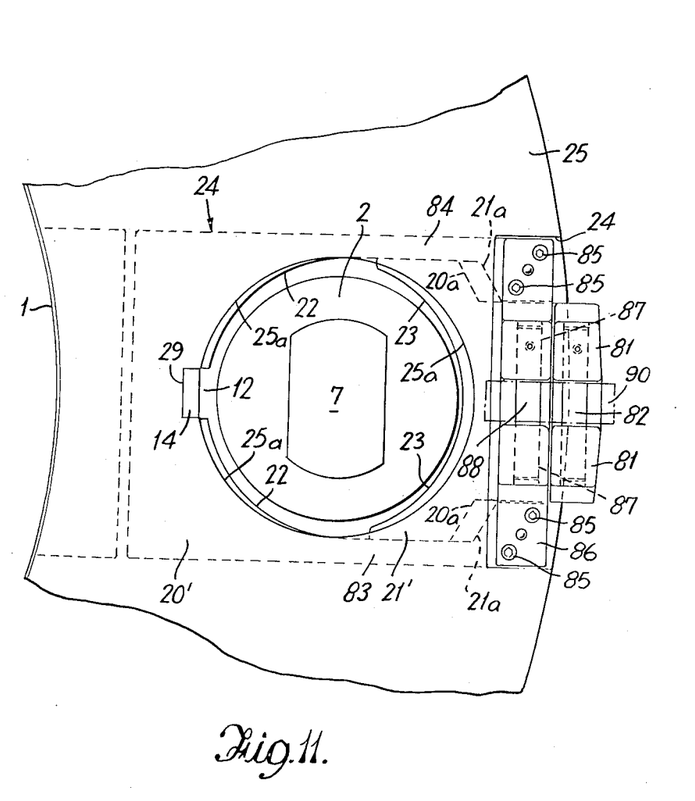
FIG. 11 is a fragmentary plan view taken on the line II—II of FIG. 10.

Reference will now be made to FIGS. 10 and 11, wherein similar parts to those appearing in FIGS. 1, 2 and 3 are designated by similar reference numerals.

A pair of latch plates 20' and 21' are mounted on the upper face of the turret 1, these plates correspondingly generally with the latch plates 20 and 21 of FIGS. 1, 2 and 3, but being modified for operation by means hereinafter to be described. As in the first described embodiments the latch plates have substantially semi-circular opposing edges 22 and 23 and are slidably registered for movement radially of the turret in a slot or recess 24 in an annular top casting 25 bolted to the turret rim 1. The latch plates 20' and 21' may be guided by tenons and slots, which are not shown in FIGS. 10 and 11, but which may be arranged as indicated at 24a in FIGS. 2 and 3.

The substantially semi-circular edge of the latch plate 20' is interrupted at 29 to allow passage of the key 14 during operation.

The latch plate 21' includes an extension 80 to which is secured a clevis member 81 having a pin 82 secured in the arms thereof. The latch plate 20' is provided with portions 83 and 84 extending on each side of the latch plate 21' and having secured to their ends, such as by bolts 85, a stretcher member 86 which extends over the upper face of the part 80 of the latch plate 21'. This stretcher member is provided with clevis arms 87 having secured therein a pin 88.

An auxiliary ram 89 is slidably mounted in the part 5 and is connected at its upper end (not shown) with the main ram 4, for example by means of a bar extending laterally from the upper end of the auxiliary ram and engaging with the main ram. In the case of a mechanically operated press said bar may be bifurcated so as to embrace the upper end of the ram 4 and provided with holes receiving extensions of the gudgeon pin connecting the pitman with the main ram. Corresponding arrangements are possible with other types of presses, for example pneumatically and hydraulically operated presses.

At its lower end the auxiliary ram 89 carries a spade shaped operating member 90 (shown in chain line in FIG. 11) for the latch plates 20' and 21'. This operating member includes a cylindrical part 91 (FIG. 10) which is slidably located in a sleeve 92 secured to the lower end of the auxiliary ram 89. The bore in the sleeve 92 is stepped at 93 and a collar 94 is secured to the upper end of the part 91. This collar co-operates with the step at 93 to limit the downward movement of the operating member 90, 91 with respect to the auxiliary ram 89. The operating member is urged downwardly by means of a compression spring 95 located in aligned bores of the parts 91 and the ram 89, whilst the upper face of said collar 94 is adapted to be engaged by the lower end of the ram 89 for operation in a manner which will hereinafter appear. It will be noted that a lost-motion connection is thus provided between the ram 89 and the latch plate operating member 90, 91. The member 90, 91 is prevented from rotating by engagement of the faces of the part 90 in guide slots 96 in a liner 97 for the ram 89 and in a depending part 98 of the frame 5.

The member 90 is formed with a pair of open cam slots 99 and 100 extending at an upward inclination from the lower edge of said member and adapted to receive the pins 82 and 88. The central part 101 of the member 90 is also formed with wedge surfaces 102 and 103 to facilitate entry of said part between the pins 82 and 88.

Similarly to FIG. 1 the punch 2 is provided with a radial passage 35 housing two balls 36 which are urged outwardly by means of a compression spring 37 and the internal surface of the sleeve 12 is provided with conical indentations 38 adapted to receive said balls during operation as will hereinafter be described.

The various parts are shown in FIGS. 10 and 11 in their positions immediately after the punch 2 has pierced the work 9. As described with reference to FIGS. 1, 2 and 3, when the punch is withdrawn upwardly by the ram 4 the sleeve 12 is moved upwardly by a short distance until its upper edge bears against the under surface of the latch plates 20 and 20'. The work is then stripped from the punch as the punch is retracted within the sleeve 12. During this movement of the main ram 4 the auxiliary ram 89 is moved upwardly by the same distance, but the member 90, 91 being constantly urged downwardly with respect to the ram 89 by the spring 95 will be maintained in its illustrated position. The arrangement is such, however, that when the lower end of the punch 2 has been withdrawn from the work the lost-motion between the collar 94 and the step 93 in the bore of the sleeve 92 will be taken up so that continued upward movement of the ram 89 with the ram 4 will cause the inner inclined edges of the slots 99 and 100 to engage the pins 82 and 88 and thereby move the clevis members 81 and 87 away from one another. These movements of the clevis members are transmitted directly to the latch plates 21' and 20', respectively, so that the plate 21' is moved to the right-hand in FIGS. 10 and 11, and the plate 20' is moved to the left-hand in said figs. This movement is sufficient to withdraw the arcuate surfaces 22 and 23 and the latch plates clear of the outer surface of the sleeve 12 so that the latter is free to be moved upwardly. The central portion 101 of the member 90 passes between the clevis pins 82 and 88 which, as above described, have now been separated from one another so that the member 90 is allowed to rise freely with the ram 89. When the clearance between the key 14 and the slot 18 has been taken up the sleeve 12 will be lifted bodily with the plunger during the remainder of the upward stroke of the ram 4, or the lower end of the plunger may be stepped as shown at 39 and the sleeve 12 internally shouldered as shown at 40 so that the punch will engage the sleeve to lift the latter.

As in the arrangements described with reference to FIGS. 1 to 9, the punch and sleeve may thus be withdrawn a sufficient distance, after stripping of the work from the punch, to clear the flanged edges such as 10 so that the work can be withdrawn. It will be understood that the top casting 25 is provided with an aperture 25a allowing the passage of the sleeve 12 and the key 14.

The latching plates 20' and 21' are retained in their separated positions by the upward passage of the sleeve 12 and by engagement of opposing abutment surfaces 20a and 21a (FIG. 11) on the plates.

In the operating stroke, the downward movement of the ram 4 will move the punch 2 and sleeve 12 together until the sleeve engages with the work. Further movement of the sleeve being prevented by the work, the punch 2 will continue its movement through the work and into the die. During the punching stroke and prior to the engagement of the sleeve 12 with the work the central part 101 of the member 90 will have passed between the pins 82 and 88, which, as above described, are at this time displaced outwardly from the positions shown in FIG. 10. The outer edges of the slots 99 and 100 engage with the pins 82 and 88 to tend to move the latter toward one another and thereby to displace the latch plates 20' and 21' inwardly of the bore 13 and opening 25a. This movement will be resisted by engagement of the latch plates with the outer surface of the sleeve 12 until the latter has been moved downwardly nearly to the illustrated position. The lost-motion connection between the member 90 and the auxiliary ram 89 permits the continued downward movement of the auxiliary ram with the main ram 4 at this stage of the operations in spite of the fact that the pins 82 and 88 prevent at this time downward movement of the member 90. Whilst said lost-motion is being taken up, the sleeve 12 is moved sufficiently downwardly to clear the latch plates so that during the final downward movement of the punch 2 and sleeve 12 the latch plates are moved to their illustrated positions by the cam slots 96 and 97. The lost-motion between the auxiliary ram 89 and the member 90 thus provides that during the final downward movement of the punch and latch plates remain in their retracted position, whilst during the initial upward movement of the punch the latch plates are retained in their illustrated operative positions.

During the operating or punching stroke, the spring-pressed balls 36 co-operate with the indentations 38 so as to hold the sleeve in its lowermost position with respect to the punch 2, in spite of any frictional forces, until the sleeve engages the work.

What I claim is:

1. A power press comprising a relatively movable punch and die for cutting sheet materials, stripping means including a tubular work-engaging abutment member which surrounds said punch and within which said punch is slidably mounted and which is movable towards and away from the work in the direction of movement of said punch, a lost-motion connection provided between the punch and the tubular work-engaging abutment member permitting relative movement between the punch and said abutment member in the direction of movement of the punch during the operative part of the piercing or cutting stroke of the punch and initially during withdrawal of said punch from the work and said abutment member and the punch otherwise being movable as one during the punching stroke until said abutment member is arrested by its engagement with said work, latching means arranged independently of said stripping means and comprising a pair of spaced latch members arranged one on each side of the tubular abutment member and biased to positions across the path of movement of the latter, said abutment member having a tapered latch engaging surface for temporarily forcing apart said latch members during the punching stroke of the punch upon the engagement with said latch members of said tapered latch engaging surface whereby to permit passage of said abutment member for the retention of said work and said latch members being movable into the path of return movement of said abutment member at or toward the end of the punching stroke of the punch to prevent return movement of said abutment member during withdrawal of the punch from said die, a chamfered portion on said punch effective to urge said latch members outside the path of return movement of the abutment member in response to the withdrawal of said punch by a distance sufficient to retract said punch from said work whereupon the tubular work-engaging abutment member is withdrawn positively by said punch.

2. A power press as claimed in claim 1, having a punch structure and an abutment member of cylindrical configuration, in which the latch members comprise plates slidably registered radially of the abutment member and provided with opposing concave edges displaceable into the path of the said abutment member to prevent return movement of the latter.

3. A power press as claimed in claim 1, in which the latch members comprise pivoted levers spring urged towards one another so that edges thereof are displaceable into the path of return movement of said abutment member, said latch members being mounted on the press adjacent to the die.

4. A power press as claimed in claim 3, in which the punch structure and abutment member are of cylindrical configuration and the latch members have opposed concave edges displaceable into the path of return movement of the abutment member.

5. A power press as claimed in claim 3 in which the abutment member and the punch structure are releasably interlocked during the non-operative part of the punching stroke by means of a ball-bearing snap fastening device.

References Cited in the file of this patent

UNITED STATES PATENTS

| | | |
|---|---|---|
| 655,074 | Graves | July 31, 1900 |
| 777,542 | Reynders | Dec. 13, 1904 |
| 1,305,766 | Bullard | June 3, 1919 |
| 1,940,883 | Rollings | Dec. 26, 1933 |
| 1,964,910 | Glasson | July 3, 1934 |
| 2,225,342 | Hyatt | Dec. 17, 1940 |
| 2,390,371 | Ivy | Dec. 4, 1945 |
| 2,454,432 | Crandall | Nov. 23, 1948 |
| 2,869,153 | Capek | Jan. 20, 1959 |

FOREIGN PATENTS

| | | |
|---|---|---|
| 82,476 | Switzerland | Oct. 1, 1919 |
| 178,075 | Great Britain | Sept. 28, 1922 |